United States Patent [19]
Imashiro et al.

[11] Patent Number: 5,912,290
[45] Date of Patent: Jun. 15, 1999

[54] HYDROLYSIS STABILIZER FOR ESTER GROUP-CONTAINING RESIN

[75] Inventors: Yasuo Imashiro; Ikuo Takahashi; Naofumi Horie; Takeshi Yamane, all of Tokyo, Japan

[73] Assignee: Nisshinbo Industries, Inc., Tokyo, Japan

[21] Appl. No.: 08/789,100

[22] Filed: Jan. 27, 1997

[30] Foreign Application Priority Data

Feb. 6, 1996 [JP] Japan ................................. 8-044168

[51] Int. Cl.⁶ ............................................ C08K 5/29
[52] U.S. Cl. ............................................ 524/195; 564/252
[58] Field of Search ........................ 564/252; 524/195; 528/67

[56] References Cited

U.S. PATENT DOCUMENTS

| | | | |
|---|---|---|---|
| 4,064,103 | 12/1977 | Cordes et al. | 524/195 |
| 4,419,294 | 12/1983 | Feldman et al. | 564/252 |
| 5,246,992 | 9/1993 | Wick et al. | 524/195 |
| 5,352,400 | 10/1994 | West | 564/252 |
| 5,360,933 | 11/1994 | Imashiro et al. | 564/252 |
| 5,373,080 | 12/1994 | Imashiro et al. | 564/252 |
| 5,504,241 | 4/1996 | Pohl et al. | 524/195 |
| 5,597,942 | 1/1997 | Pohl et al. | 564/252 |

FOREIGN PATENT DOCUMENTS 548815  6/1993  European Pat. Off. ............... 564/252

*Primary Examiner*—Veronica P. Hoke
*Attorney, Agent, or Firm*—Kubovcik & Kubovcik

[57] ABSTRACT

The present invention provides:

a hydrolysis stabilizer for ester group-containing resin, comprising, as the main component, a carbodiimide which is derived from tetramethylxylylene diisocyanate, and which has remaining isocyanate groups in an amount of 3% by weight or less or has the terminal isocyanate groups blocked with a monoisocyanate(s); and a method for hydrolysis stabilization of ester group-containing resin, which comprises mixing an ester group-containing resin with a carbodiimide which is derived from tetramethylxylylene diisocyanate represented by the above formula and which has remaining isocyanate groups in an amount of 3% by weight or less or has the terminal isocyanate groups blocked with a monoisocyanate(s).

2 Claims, No Drawings

HYDROLYSIS STABILIZER FOR ESTER GROUP-CONTAINING RESIN

BACKGROUND OF THE INVENTION (1) Field of the Invention

The present invention relates to a hydrolysis stabilizer for ester group-containing resin and a method for hydrolysis stabilization of ester group-containing resin using the hydrolysis stabilizer. More particularly, the present invention relates to a hydrolysis stabilizer for ester group-containing resin, which comprises, as the main component, a carbodiimide having excellent compatibility with ester group-containing resins and thereby showing an excellent anti-hydrolysis effect to ester group-containing resins; as well as to a method for hydrolysis stabilization of ester group-containing resin using the hydrolysis stabilizer.

(2) Description of the Prior Art

Ester group-containing resins (e.g. polyester polyurethane resin) (hereinafter abbreviated to ester type resins, in some cases) are used in various applications for their excellent elasticity and moldability. The polyester polyurethane resins, however, are known to have problems. That is, since they are produced by subjecting a diisocyanate [e.g. 4,4'-diphenylmethane diisocyanate (MDI) or tolylene diisocyanate (TDI)] and a bifunctional polyester polyol to urethanization and have a number of ester groups in the molecule, the ester groups are generally hydrolyzed easily by moisture (this causes reduction in molecular weight) and the acidic carboxyl groups generated by the hydrolysis promote further hydrolysis of ester bonds, resulting in strength reduction; owing to this strength reduction, the polyester polyurethane resin becomes incapable of resisting to the strain generated during curing, which invites cracking or further strength reduction.

In order to prevent the properties deterioration of polyester polyurethane, such as mentioned above, attempts have been made to add various additives to a polyester polyurethane resin during its molding to trap the carboxyl groups generated by hydrolysis and prevent the further proceeding of hydrolysis.

As such additives, there are used, for example, oxazoline, epoxy, aromatic polycarbodiimides and monocarbodiimides. Of them, oxazoline and epoxy are not satisfactory because they show a low anti-hydrolysis effect.

The aromatic polycarbodiimides have problems, also. They are a solid and have a high softening point and, in a liquid state when heated, a very high viscosity. Therefore, they have low compatibility with polyester polyurethane resins and cannot be added to the resin during its synthesis; to enable their addition to the polyester polyurethane resin by melt kneading, a very complicated apparatus and a fairly long time are needed and a non-uniform dispersion is formed; as a result, no sufficient anti-hydrolysis effect is obtained.

The monocarbodiimides have problems as well. As the monocarbodiimides, aliphatic or aromatic monocarbodiimides were reported. They have a low melting point and can be added to a polyester polyurethane resin during its synthesis. However, when the polyester polyurethane resin and the monocarbodiimide are dry-blended for their molding or spinning, or when the monocarbodiimide is kneaded into the polyester polyurethane resin from a metering hopper, the monocarbodiimide is separated from the resin owing to the low molecular weight (therefore, relatively high volatility) of the former and, moreover, bleeds out from the resin owing to the low molecular weight; consequently, no intended effect is obtained and the polyester polyurethane resin has a low performance.

In Japanese Patent Application Kokai (Laid-Open) No. 017939/1995 is disclosed a carbodiimide which has a polymerization degree n of 0–10 and isocyanate terminals and which has improved compatibility with polyester polyurethane resins. This carbodiimide, however, has problems when it has remaining isocyanate groups in an amount (hereinafter referred to simply as NCO content, in some cases) of more than 3% by weight (polymerization degree n=10 corresponds to NCO content=about 3.7% by weight, and reduction in polymerization degree n gives an increase in NCO content). That is, in such a carbodiimide, the terminal isocyanate groups give rise to carbon dioxide removal in the presence of moisture and change into urea; when a polyester polyurethane resin containing such a carbodiimide is used as a surface-coating agent or the like, no smooth surface is obtained because of the voids formed by the carbon dioxide removal from the carbodiimide; moreover, since the urea has low compatibility with the polyester polyurethane resin, the polyester polyurethane resin comes to show properties deterioration in elasticity, strength, etc.

Also In the above Japanese Patent Application Kokai (Laid-Open) No. 017939/1995 is disclosed a carbodiimide having terminal isocyanate groups blocked with an alcohol or an amine. This carbodiimide, however, has disadvantages. That is, blocking with an amine produces urea as a product, which is disadvantageous for the reasons mentioned above; use of a blocking agent such as alcohol or amine results in significant increase in carbodiimide equivalents of the carbodiimide, which requires use of carbodiimide in a large amount in order to obtain an anti-hydrolysis effect.

OBJECT AND SUMMARY OF THE INVENTION

The present invention has been completed with an object of providing a hydrolysis stabilizer for ester type resin which is free from the problems of conventional hydrolysis stabilizers for ester type resin, has excellent compatibility with ester type resins such as polyester polyurethane resin and the like, can be easily added with no problem during the synthesis of ester type resin or during the melt-kneading of the resin, moreover, has a high molecular weight, therefore, shows an excellent anti-hydrolysis effect to ester type resins; and a method for hydrolysis stabilization of ester type resin.

According to the present invention there are provided:

a hydrolysis stabilizer for ester group-containing resin, comprising, as the main component, a carbodiimide which is derived from tetramethylxylylene diisocyanate represented by the following formula:

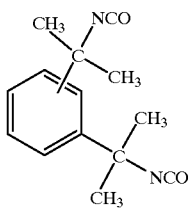

and which has remaining isocyanate groups in an amount of 3% by weight or less or has the terminal isocyanate groups blocked with a monoisocyanate(s); and a method for hydrolysis stabilization of ester group-containing resin, which comprises mixing an ester group-containing resin with a carbodiimide which is derived from tetramethylxylylene diisocyanate represented by the above formula and which has remaining isocyanate groups in an amount of 3% by weight or less or has the terminal isocyanate groups blocked with a monoisocyanate(s)

DETAILED DESCRIPTION OF THE INVENTION

The present invention is hereinafter described in detail.

The hydrolysis stabilizer for ester type resin according to the present invention comprises, as the main component, a carbodiimide derived from tetramethylxylylene diisocyanate (hereinafter abbreviated to "TMXDI" in some cases) represented by the above-shown formula, having an NCO content of 3% by weight or less. Such a carbodiimide can be produced by subjecting TMXDI (a raw material) to carbodiimidization wherein carbon dioxide removal takes place.

As is clear from the above formula, TMXDI has isomers. In the present invention, any carbodiimide derived from any isomer can be used.

The above carbodiimidization is conducted in the presence of an appropriate carbodiimidization catalyst. The carbodiimidization catalyst usable is preferably an organic phosphorus type compound, particularly preferably phosphorene oxide in view of the activity. Specific examples of the catalyst are 3-methyl-1-phenyl-2-phosphorene-1-oxide, 3-methyl-1-ethyl-2-phosphorene-1-oxide, 1,3-dimethyl-2-phosphorene-1-oxide, 1-phenyl-2-phosphorene-1-oxide, 1-ethyl-2-phosphorene-1-oxide, 1-methyl-2-phosphorene-1-oxide and double bond isomers thereof. of these, particularly preferable is 3-methyl-1-phenyl-2-phosphorene-1-oxide which is easily available in industry.

The carbodiimidization can be conducted by a known process. For example, to TMXDI dissolved in a solvent inert thereto or to TMXDI itself is added the above-mentioned catalyst in an amount of 0.1–10% by weight (a larger amount is possible when the economy is neglected), preferably 0.5–5% by weight based on the total isocyanate; the mixture is stirred at 150–200° C. in an inert gas (e.g. nitrogen) current or in bubbling of the inert gas; thereby, carbodiimidization (wherein carbon dioxide removal takes place) is allowed to proceed.

The time of carbodiimidization varies depending upon the carbodiimidization temperature, the kind and amount of catalyst, etc. but is complete generally in about 30 hours when 3-methyl-1-phenyl-2-phosphorene-1-oxide is added to TMXDI (a raw material) in an amount of 2% by weight based on the total isocyanate and carbodiimidization is conducted at 185° C. to obtain a TMXDI-derived carbodiimide.

The proceeding of the carbodiimidization can be confirmed by examining the absorption of isocyanate group seen at 2,258 cm$^{-1}$ in infrared absorption spectrum. In the carbodiimide used in the hydrolysis stabilizer for ester type resin according to the present invention, it is necessary that the NCO content is 3% by weight or less in view of the anti-hydrolysis effect. This remaining isocyanate groups (NCO content) can be measured by titration.

When TMXDI is polymerized in a linear form and the resulting carbodiimide has an NCO content of 3% by weight, the polymerization degree of the carbodiimide is 12.78. According to the qualitative analysis using a spectrum obtained by mass spectrometry, it is thought that in the above carbodiimidization, TMXDI is polymerized also in a cyclic form. Therefore, the carbodiimide used in the present invention need not have a high polymerization degree.

The hydrolysis stabilizer for ester type resin according to the present invention may have terminal isocyanate groups blocked in order to reduce the remaining isocyanate groups as low as possible. Such a carbodiimide can be obtained by mixing TMXDI with at least one kind of monofunctional isocyanate, adding a catalyst, and heating the mixture to subject TMXDI and the monofunctional isocyanate to a condensation reaction.

The monofunctional isocyanate is not particularly restricted and includes, for example, n-butyl isocyanate, tert-butyl isocyanate and cyclohexyl isocyanate.

The thus-synthesized carbodiimide is represented by the following formula:

OCN–(R$_1$—NCN)n—R$_1$—NCO (wherein R$_1$ is a TMXDI residue obtained by removing NCO groups from TMXDI, and n is an integer of 1 or more), or by the following formula:

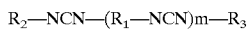

R$_2$—NCN—(R$_1$—NCN)m—R$_3$ (wherein R$_1$ is a TMXDI residue obtained by removing NCO groups from TMXDI; R$_2$ and R$_3$ may be the same or different and are each a monoisocyanate residue obtained by removing an NCO group from a monoisocyanate; and m is an integer of 1 or more).

The hydrolysis stabilizer for ester type resin according to the present invention comprises the above-mentioned carbodiimide as the main component. The stabilizer may comprise the carbodiimide alone, or the carbodiimide and an appropriate auxiliary agent.

The method for hydrolysis stabilization of ester type resin according to the present invention comprises mixing an ester type resin with the carbodiimide. The mixing method is not particularly restricted and an appropriate method can be employed.

The proportion of the present hydrolysis stabilizer for ester type resin is, for example, 0.1–10 parts by weight, preferably 0.3–5 parts by weight per 100 parts by weight of the ester type resin. When the proportion is less than 0.1 part by weight, the addition effect is not sufficient. When the proportion is more than 10% by weight, the properties (e.g. strength and elasticity) of the ester type resin are deteriorated.

The present invention is hereinafter described in more detail by way of Examples.

SYNTHESIS OF CARBODIIMIDES

Synthesis 1

To 300 g of m-TMXDI was added 6 g of 3-methyl-1-phenyl-2-phosphorene-1-oxide (a carbodiimidization catalyst) (the compound is hereinafter abbreviated to the carbodiimidization catalyst). They were subjected to a condensation reaction at 185° C. for 50 hours in a nitrogen current. The resulting carbodiimide had an NCO content of 0.05% by weight.

Syntheses 2 and 3

Two carbodiimides shown in Table 1 were obtained in the same manner as in Synthesis 1 except that the proportions of raw materials and the reaction time were changed to those shown in Table 1.

TABLE 1

| Synthesis | TMXDI amount (g) | Catalyst amount (g) | Reaction temp. (° C.) | Reaction time (hr) | NCO (%) |
|---|---|---|---|---|---|
| 2 | 300 | 6 | 185 | 21 | 1.35 |
| 3 | 400 | 8 | 185 | 24 | 0.28 |

Synthesis 4

To 219.6 g of TMXDI were added 19.8 g of n-butyl isocyanate (a monoisocyanate) and 4.8 g of the carbodiimidization catalyst. They were reacted at 185° C. for 19 hours to obtain a carbodiimide having an average polymerization degree n of 10.

Syntheses 5 to 9

Six carbodiimides shown in Table 2 were obtained in the same manner as in Synthesis 1 except that the proportions of raw materials and the reaction time were changed to those shown in Table 2.

TABLE 2

| Synthesis | TMXDI Amount (g) | Monoisocyante*[1] and its amount (g) | Catalyst amount (g) | Reaction time (hr) | Polymerization deg. (n) |
|---|---|---|---|---|---|
| 5 | 488.0 | N-Butyl isocyanate 19.8 | 10.2 | 23 | 21 |
| 6 | 561.2 | Cyclohexyl isocyanate 25.0 | 11.7 | 21 | 24 |
| 7 | 219.6 | Benzyl isocyanate 26.6 | 4.9 | 20 | 10 |
| 8 | 219.6 | Hexyl isocyanate 25.4 | 4.9 | 18 | 10 |
| 9 | 219.6 | Octyl isocyanate 19.8 | 4.8 | 19 | 10 |

*[1]Terminal-blocking agent

Comparative Synthesis 1

6.0 g of the carbodiimidization catalyst was added to 300 g of TMXDI. They were reacted at 185° C. for 15 hours to obtain a carbodiimide having terminal isocyanates and a molecular weight of about 1,130 and an NCO content of 7.41% by weight.

Comparative Synthesis 2

To 268.4 g of TMXDI were added 14.6 g of tert-butylamine (a terminal-blocking agent) and 5.37 g of the carbodiimidization catalyst. They were reacted at 185° C. for 25 hours until the absorption of isocyanate disappeared in the infrared absorption spectrum, whereby was obtained a carbodiimide having the terminal isocyanate groups blocked with a urea group, having an average polymerization degree n of 10.

Comparative Synthesis 3

9.76 g of the carbodiimidization catalyst was added to 488 g of TMXDI. They were reacted at 185° C. for 10 hours. When the NCO content of the reaction product reached 9.30% by weight, 372 g of methoxypolyoxyethylene alcohol having an average molecular weight of 520 was added with stirring while the system temperature was being kept at 185° C. One hour later, change of terminal isocyanate groups to a urethane group, i.e. disappearance of isocyanate was confirmed by IR absorption spectrum. Thereby, a terminal-blocked carbodiimide having an average molecular weight of about 1,700 was obtained.

Comparative Synthesis 4

To 268 g of TMXDI were added 26.0 g of 2-ethylhexanol and 5.4 g of the carbodiimidization catalyst. They were reacted at 185° C. for 20 hours until the absorption of isocyanate disappeared in the infrared absorption spectrum, whereby was obtained a carbodiimide having the terminal isocyanate groups blocked with a urea group, having an average polymerization degree n of 10.

EXAMPLE 1

100 g of an ester type urethane elastomer produced by Nisshinbo Industries, Inc. (product serial No.: F-30) was dissolved in 300 g of dimethylformamide (DMF) at 60° for 2 hours. Thereto were added 500 g of tetrahydrofuran (THF) and, as a hydrolysis stabilizer, 1 g of one of the carbodiimides synthesized in the above Syntheses and Comparative Syntheses, followed by mixing at 60° C. for 1 hour. Each mixture was casted on a polyethylene terephthalate (PET) film and dried, under reduced pressure, at 80° C. for 1 hour and at 100° C. for 2 hours to obtain a film having a thickness of about 200–250 μm. Each film was subjected to punching in the shape of No. 4 dumbbell specified by JIS K 6301 to obtain a specimen. Each specimen was immersed in water of 95° C. for a time period specified in Table 3 and then measured for retention of tensile strength. In Table 3, Blank is a case using no carbodiimide, and References 1 and 2 are cases using an aromatic polycarbodiimide (derived from 1,3-diisocyanato-2,4,6-triisopropylbenzene) and an aromatic monocarbodiimide [derived from di-(2,6-diisopropylphenyl)-carbodiimide], respectively [these two carbodiimides are described in Japanese Patent Application Kokai (Laid-Open) No. 017939/1995]. The results are shown in Table 3.

TABLE 3

Retention of tensile strength

| Time (days) | Carbodiimide added | | | | | | | |
|---|---|---|---|---|---|---|---|---|
| | Blank | Synthesis 1 | Synthesis 2 | Synthesis 3 | Synthesis 4 | Synthesis 5 | Synthesis 6 | Synthesis 7 |
| 0 | 100 | 100 | 100 | 100 | 100 | 100 | 100 | 100 |
| 5 | 34 | 81 | 80 | 81 | 80 | 79 | 80 | 78 |
| 11 | — | 67 | 58 | 62 | 62 | 63 | 61 | 60 |
| 15 | — | 56 | 47 | 52 | 50 | 52 | 51 | 51 |
| 21 | — | 34 | 16 | 23 | 22 | 28 | 20 | 20 |

| Time (days) | Synthesis 8 | Synthesis 9 | Comparative Synthesis 1 | Comparative Synthesis 2 | Comparative Synthesis 3 | Comparative Synthesis 4 | Reference 1 | Reference 2 |
|---|---|---|---|---|---|---|---|---|
| 0 | 100 | 100 | 100 | 100 | 100 | 100 | 100 | 100 |
| 5 | 80 | 80 | 73 | 72 | 66 | 68 | 75 | 71 |
| 11 | 62 | 60 | 50 | 32 | 17 | 35 | 54 | 37 |
| 15 | 51 | 52 | 20 | 5 | 17 | 8 | 25 | — |
| 21 | 21 | 23 | 20 | 5 | 17 | 8 | — | — |

—: Test piece was deteriorated or collapsed and unable to measure.

EXAMPLE 2

To a polybutylene terephthalate (PBT) produced by Dainippon Ink and Chemicals, Inc. (product serial No.: BT-1000) was added, as a hydrolysis stabilizer, 1% by weight of one of the carbodiimides synthesized in the above Syntheses and Comparative Syntheses. They were melt-kneaded using a twin screw extruder, followed by extrusion using a T die, to obtain a film having a thickness of 200 $\mu$m. Each film was subjected to punching in the shape of No. 4 dumbbell specified by JIS K 6301 to obtain a specimen. Each specimen was immersed in water of 95° C. for a time period specified in Table 4 and then measured for retention of tensile strength. In Table 4, Blank is a case using no carbodiimide. The results are shown in Table 4.

EXAMPLE 3

To a polyethylene terephthalate (PET) produced by Kanebo, Ltd. (product serial No.: EFG-7) was added, as a hydrolysis stabilizer, 1% by weight of one of the carbodiimides synthesized in the above Syntheses and Comparative Syntheses. They were melt-kneaded using a twin screw extruder, followed by extrusion using a T die, to obtain a film having a thickness of 500 $\mu$m. Each film was subjected to punching in the shape of No. 4 dumbbell specified by JIS K 6301 to obtain a specimen. Each specimen was placed on a stainless steel-made wire net in an atmosphere of 80° C. and 90% relative humidity for a time period shown in Table 5, and then measured for retention of tensile strength. In Table 5, Blank is a case using no carbodiimide. The results are shown in Table 5.

TABLE 4

Retention of tensile strength

| Time (days) | Carbodiimide added | | | | | | |
|---|---|---|---|---|---|---|---|
| | Blank | Synthesis 1 | Synthesis 2 | Synthesis 3 | Synthesis 4 | Synthesis 5 | Synthesis 6 |
| 0 | 100 | 100 | 100 | 100 | 100 | 100 | 100 |
| 10 | 68 | 95 | 90 | 93 | 96 | 97 | 96 |
| 15 | 42 | 79 | 71 | 76 | 77 | 80 | 78 |
| 20 | 25 | 44 | 39 | 43 | 44 | 47 | 45 |
| 30 | 17 | 31 | 28 | 30 | 31 | 35 | 32 |

| Time (days) | Synthesis 7 | Synthesis 8 | Synthesis 9 | Comparative Synthesis 1 | Comparative Synthesis 2 | Comparative Synthesis 3 | Comparative Synthesis 4 |
|---|---|---|---|---|---|---|---|
| 0 | 100 | 100 | 100 | 100 | 100 | 100 | 100 |
| 10 | 96 | 96 | 97 | 72 | 70 | 65 | 68 |
| 15 | 76 | 77 | 78 | 55 | 47 | 40 | 40 |
| 20 | 45 | 47 | 48 | 30 | 27 | 23 | 24 |
| 30 | 30 | 32 | 31 | 21 | 20 | 15 | 17 |

TABLE 5

| Time (days) | Retention of tensile strength | | | | | | |
|---|---|---|---|---|---|---|---|
| | | Carbodiimide added | | | | | |
| | Blank | Synthesis 1 | Synthesis 2 | Synthesis 3 | Synthesis 4 | Synthesis 5 | Synthesis 6 |
| 0 | 100 | 100 | 100 | 100 | 100 | 100 | 100 |
| 10 | 102 | 101 | 101 | 100 | 105 | 101 | 103 |
| 30 | 94 | 100 | 100 | 101 | 100 | 102 | 101 |
| 60 | 73 | 98 | 98 | 95 | 97 | 95 | 95 |

| Time (days) | Synthesis 7 | Synthesis 8 | Synthesis 9 | Comparative Synthesis 1 | Comparative Synthesis 2 | Comparative Synthesis 3 | Comparative Synthesis 4 |
|---|---|---|---|---|---|---|---|
| 0 | 100 | 100 | 100 | 100 | 100 | 100 | 100 |
| 10 | 102 | 101 | 103 | 101 | 102 | 101 | 100 |
| 30 | 100 | 101 | 102 | 95 | 100 | 97 | 99 |
| 60 | 95 | 97 | 97 | 65 | 82 | 67 | 80 |

The hydrolysis stabilizer for ester group-containing resin according to the present invention contains, as the main component, a carbodiimide derived from tetramethylxylylene diisocyanate, which has remaining isocyanate groups in an amount of 3% by weight or less or the terminal groups blocked with a monoisocyanate. The present hydrolysis stabilizer, therefore, has excellent computability with ester type resins such as polyester polyurethane resin and the like and can be easily added with no problem during the synthesis or melt-kneading of ester type resin; moreover, has a high molecular weight; therefore, can sufficiently exhibit an anti-hydrolysis effect to ester type resins.

The method for hydrolysis stabilization of ester type resin according to the present invention comprises mixing an ester group-containing resin with the above carbodiimide; therefore, the method can be carried out easily and can impart a hydrolysis-stabilizing effect to ester group-containing resins.

What is claimed is:

1. A method for hydrolysis stabilization of a carboxylic acid ester group-containing resin, which comprises mixing a carboxylic acid ester group-containing resin with a carbodiimide which is derived from a tetramethylxylylene diisocyanate (TMXDI), said carbodiimide being represented by the following formula:

$$OCN-(R_1-NCN)_n-R_1-NCO$$

wherein $R_1$ is a TMXDI residue obtained by removing NCO groups from TMXDI, and n is an integer of 13 or more, and in which the amount of remaining isocyanate groups is 3% by weight or less, or by the following formula:

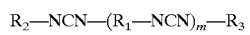

$$R_2-NCN-(R_1-NCN)_m-R_3$$

wherein $R_1$ is a TMXDI residue obtained by removing NCO groups from TMXDI and wherein $R_2$ and $R_3$ may be the same or different and each is a monoisocyanate residue obtained by removing an NCO group from a monoisocyanate and m is an integer of 10 or more.

2. A method according to claim 1, wherein the carbodiimide is used in an amount of 0.1–10 parts by weight per 100 parts by weight of the carboxylic acid ester group-containing resin.

* * * * *